(12) United States Patent
Bowers (10) Patent No.: US 7,571,918 B2
(45) Date of Patent: Aug. 11, 2009

(54) SUSPENSION ARM FOR A VEHICLE (75) Inventor: Lee N. Bowers, Springfield, OH (US)

(73) Assignee: Honda Motor Company, Ltd., Tokyo (JP)

( * ) Notice: Subject to any disclaimer, the term of this patent is extended or adjusted under 35 U.S.C. 154(b) by 357 days.

(21) Appl. No.: 11/395,859

(22) Filed: Mar. 31, 2006

(65) Prior Publication Data
US 2007/0228684 A1 Oct. 4, 2007

(51) Int. Cl.
B60G 3/20 (2006.01)

(52) U.S. Cl. .................. 280/124.138; 280/124.135; 280/124.136

(58) Field of Classification Search .................. 280/124.134–124.136, 124.138, 124.142, 280/124.15, 788
See application file for complete search history.

(56) References Cited

U.S. PATENT DOCUMENTS

| 2,303,545 | A | | 12/1942 | Graham, Jr. | |
|---|---|---|---|---|---|
| 2,611,625 | A | * | 9/1952 | Kishline et al. | 280/124.109 |
| 2,631,044 | A | * | 3/1953 | Booth | 280/124.108 |
| 2,779,603 | A | * | 1/1957 | McRae | 280/124.136 |
| 3,026,124 | A | | 3/1962 | Eyb | |
| 3,620,548 | A | | 11/1971 | Winsen et al. | |
| 3,798,396 | A | | 3/1974 | Mann | |
| 3,883,152 | A | | 5/1975 | de Carbon | |
| 4,377,298 | A | * | 3/1983 | Finn et al. | 280/124.142 |
| 4,662,467 | A | * | 5/1987 | Arai et al. | 180/210 |
| 4,683,970 | A | | 8/1987 | Smith | |
| 4,763,920 | A | | 8/1988 | Huidekoper | |
| 4,786,075 | A | * | 11/1988 | Takahashi | 180/254 |
| 4,799,708 | A | * | 1/1989 | Handa et al. | 280/796 |
| 4,925,207 | A | | 5/1990 | Haraguchi | |
| 4,951,964 | A | | 8/1990 | Sakamoto et al. | |
| 4,953,891 | A | | 9/1990 | Zantinge | |
| 4,955,634 | A | | 9/1990 | Smith | |
| 4,968,056 | A | | 11/1990 | Haraguchi | |
| 5,022,673 | A | | 6/1991 | Sekino et al. | |
| 5,267,751 | A | * | 12/1993 | Hiromoto et al. | 280/124.151 |
| 5,685,556 | A | * | 11/1997 | Shibue et al. | 280/124.128 |
| 6,431,569 | B2 | | 8/2002 | Handa | |
| 7,273,220 | B2 | * | 9/2007 | Gaupp et al. | 280/124.134 |
| 7,303,051 | B2 | * | 12/2007 | Seki | 188/18 A |
| 7,322,591 | B2 | * | 1/2008 | Seki | 280/124.152 |
| 7,377,549 | B2 | * | 5/2008 | Hasegawa et al. | 280/770 |
| 2005/0110264 | A1 | | 5/2005 | Seki et al. | |
| 2005/0178603 | A1 | * | 8/2005 | Takeshima et al. | 180/311 |

(Continued)

FOREIGN PATENT DOCUMENTS

JP 01190508 A * 7/1989

Primary Examiner—Glenn Dayoan
Assistant Examiner—Laura Freedman
(74) Attorney, Agent, or Firm—Ulmer & Berne LLP (57) ABSTRACT A suspension arm is configured for pivotable attachment to a vehicle's frame and for at least partially supporting a wheel knuckle. The suspension arm includes first and second elongated support members which each have proximal and distal ends. The suspension arm also includes a bracket formed from sheet metal. The support arm is configured for pivotable attachment to a vehicle's frame adjacent to the proximal ends of the first and second elongated support members. The distal ends of the first and second elongated support members are attached to the bracket. The bracket defines an opening configured for receiving a wheel knuckle. A pair of suspension arms and a vehicle having first and second suspension arms are also provided.

20 Claims, 9 Drawing Sheets

U.S. PATENT DOCUMENTS

2006/0006623 A1* 1/2006 Leclair ................. 280/93.512
2006/0066068 A1* 3/2006 Takahashi et al. ..... 280/124.109
2006/0066069 A1* 3/2006 Yanai et al. ........... 280/124.135
2007/0170682 A1* 7/2007 Kinugasa ............. 280/124.135

* cited by examiner

SUSPENSION ARM FOR A VEHICLE

TECHNICAL FIELD

The present invention relates to a suspension arm configured for pivotal attachment to the frame of a vehicle. The suspension arm is additionally configured for supporting a wheel knuckle.

BACKGROUND OF THE INVENTION

Many conventional wheeled vehicles include a suspension system for supporting wheels with respect to the frame of a vehicle. Suspension systems can be useful to help absorb shocks and/or vibrations that would otherwise be transmitted from a road surface to the frame of a vehicle. Suspension systems are available in many of a variety of alternative conventional configurations. One of these configurations involves the use of one or more suspension arms to support a wheel with respect to a vehicle's frame. In such a configuration, an upper suspension arm and a lower suspension arm can be used to support a wheel knuckle, wherein the wheel knuckle includes a spindle for rotatably supporting a wheel. Such upper and lower suspension arms are available in a variety of conventional arrangements.

Figure 8:
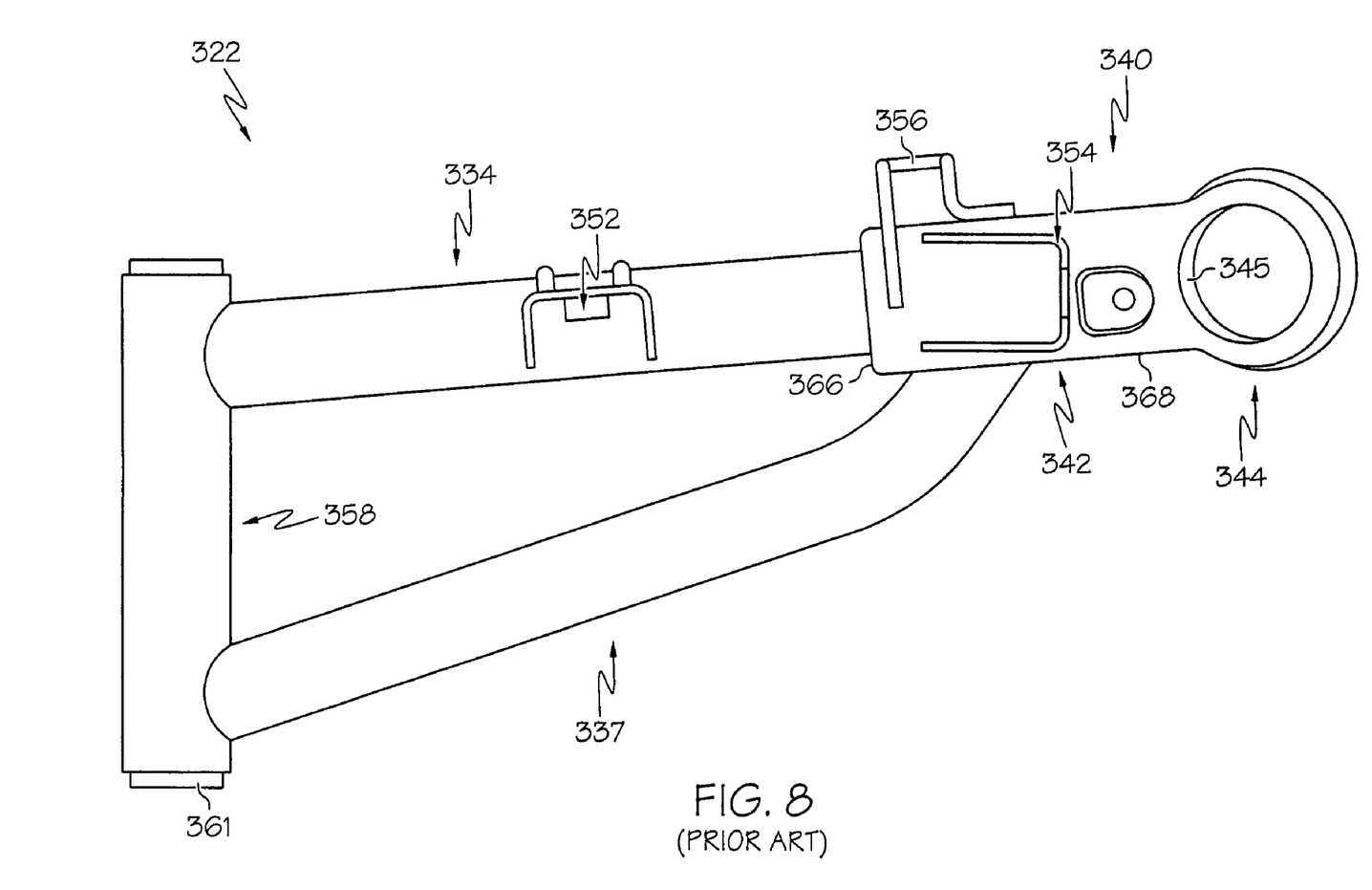
FIG. 8 is a top plan view depicting a conventional suspension arm.

For example, as shown in FIG. 8, a suspension arm 322 is shown to comprise a first elongated support member 334, a second elongated support member 337, a third elongated support member 358, and a forged bracket 340. Proximal ends of the first and second elongated support members 334, 337 are shown to be welded to the third elongated support member 358. A distal end of the first elongated support 334 member penetrates an opening in an end surface 366 of the bracket 340 and is welded in place. A distal end of the second elongated support member 337 is welded to a side surface 368 of the bracket 340.

The first elongated support member 334 and the third elongated support member 358 comprise substantially straight pipes, while the second elongated support member 337 comprises a bent pipe. The bracket 340 is formed through a forging process and includes an opening 345 to receive a ball joint connected with a wheel knuckle. The bracket 340 includes an attachment portion 342 which provides the end surface 366 and the side surface 368, as well as a kick portion 344 which defines the opening 345. The suspension arm 322 also includes utility tabs 352 and 356 to facilitate connection of a brake line, as well as a utility tab 354 to facilitate attachment of a cushion (e.g., shock, strut, and/or spring). A support arrangement 361 is provided within the third elongated support member 358 to facilitate a pivotable connection with a bolt, axle or other interface between the third elongated support member 358 and the frame of an associated vehicle.

Manufacture of the suspension arm 322 is expensive due to the need for bending of the second elongated support member 337, and additionally due to the relatively high cost of manufacturing the bracket 340 as a forging, and still furthermore due to the need for highly complex welding to facilitate effective attachment between dissimilar materials (e.g., the bracket 340 is forged, unlike the first and second elongated support members 334, 337). Furthermore, when making a corresponding suspension arm for an opposite side of the same vehicle, it will be appreciated that at least the bracket 340 must be replaced with an alternative bracket. Accordingly, a manufacturer must purchase differing components for manufacturing such suspension arms configured for opposite sides of the same vehicle.

Figure 9:
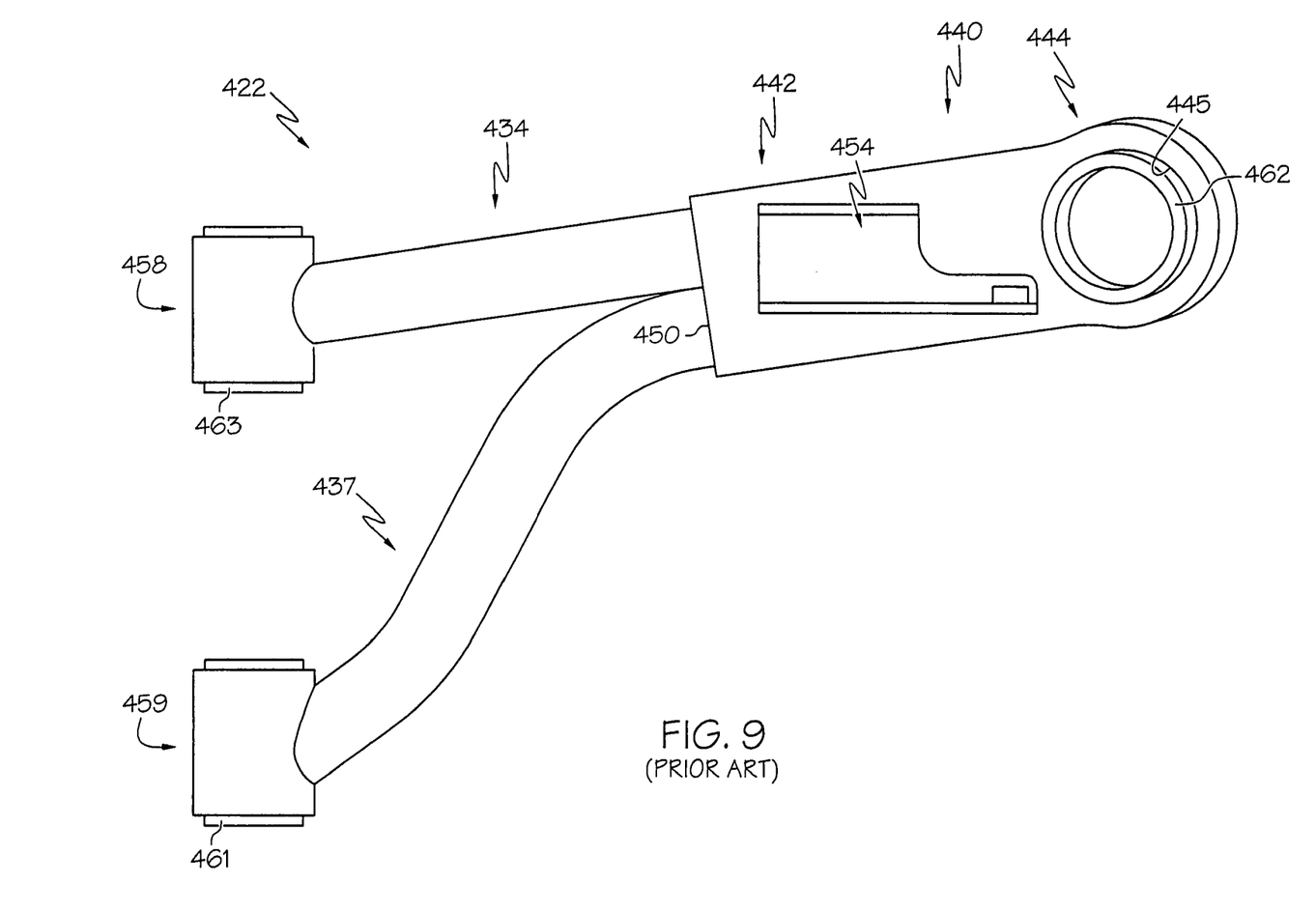
FIG. 9 is a top plan view depicting another conventional suspension arm.

As another example, FIG. 9 depicts a conventional suspension arm 422 comprising a first elongated support member 434, a second elongated support member 437, a support member 458, a support member 459, and a bracket 440. The first elongated support member 434 is substantially straight, while the second elongated support member 437 is bent. The bracket 440 is formed from stamped sheet metal and comprises an attachment portion 442 and a kick portion 444. The attachment portion 442 includes a bottom surface 450 to which distal ends of the first and second elongated support members 434, 437 are attached, such as by welding. The kick portion 444 includes an opening 445 for supporting a ring 462 which can receive a ball joint of a wheel knuckle.

A proximal end of the first elongated support member 434 is welded to the support member 458, and a proximal end of the second elongated support member 437 is welded to the support member 459. The support member 458 includes a support arrangement 463, and the support member 459 includes a support arrangement 461. The support members 458 and 459 can facilitate the pivotal attachment of the suspension arm 422 with respect to the frame of a vehicle. A utility tab 454 is welded or otherwise attached to the bracket 440 to facilitate attachment of a cushion to the suspension arm 422. As discussed above with respect to FIG. 8, the suspension arm 422 of FIG. 9 is expensive to manufacture due to the need for bending the second elongated support member 437. In addition, as with the suspension arm 322 depicted in FIG. 8, it will be appreciated that the bracket 440 of the suspension arm 422 is not suitable for use upon both sides of a vehicle because the kick portion 444 has a compound angle with respect to the attachment portion 442. Accordingly, as with the suspension arm 322 of FIG. 8, when making a corresponding suspension arm for an opposite side of the same vehicle, it will be appreciated that at least the bracket 440 must be replaced with an alternative bracket. Accordingly, a manufacturer must purchase differing components for manufacturing such suspension arms configured for opposite sides of the same vehicle.

SUMMARY OF THE INVENTION

In accordance with one embodiment of the present invention, a suspension arm is configured for pivotable attachment to a vehicle frame and for at least partially supporting a wheel knuckle. The suspension arm comprises a first elongated support member, a second elongated support member, and a bracket. The first elongated support member has proximal and distal ends and is configured for pivotable attachment to a vehicle's frame adjacent to its proximal end. The first elongated support member has a first longitudinal axis. The second elongated support member has proximal and distal ends and is configured for pivotable attachment to a vehicle's frame adjacent to its proximal end. The second elongated support member has a second longitudinal axis. The first longitudinal axis and the second longitudinal axis together define a first plane. The bracket has an attachment portion and a kick portion which are both formed substantially from stamped sheet metal. The kick portion defines an opening configured for receiving a wheel knuckle. The first elongated support member and the second elongated support member are attached to the attachment portion. A second plane which is perpendicular to the first plane intersects the center of the opening and divides the bracket into a first side and a second side such that the bracket is substantially symmetrical about the second plane.

In accordance with another embodiment of the present invention, a vehicle comprises a frame, a left wheel, a right wheel, a first wheel knuckle supporting the left wheel, a second wheel knuckle supporting the right wheel, a first suspension arm, and a second suspension arm. The first suspension arm comprises a first elongated support member, a second elongated support member, and a first bracket. The first elongated support member has proximal and distal ends and is pivotably attached to the frame adjacent to its proximal end. The distal end of the first elongated support member is attached to the first bracket. The second elongated support member has proximal and distal ends and is pivotably attached to the frame adjacent to its proximal end. The distal end of the second elongated support member is attached to the first bracket. The first bracket comprises stamped sheet metal and defines a first opening which receives the first wheel knuckle. The second suspension arm comprises a third elongated support member that is substantially identical to the first elongated support member, a fourth elongated support member that is substantially identical to the second elongated support member, and a second bracket that is substantially identical to the first bracket. The third elongated support member and the fourth elongated support member are both attached to the second bracket and are configured for pivotable attachment to the frame. The second bracket defines a second opening which receives the second wheel knuckle.

In accordance with yet another embodiment of the present invention, a pair of suspension arms is configured for pivotable attachment to a frame of a vehicle and for at least partially supporting left and right wheel knuckles on opposite sides of the vehicle. The pair of suspension arms comprises a left suspension arm and a right suspension arm. The left suspension arm comprises a first elongated support member, a second elongated support member, and a first bracket. The first elongated support member has proximal and distal ends and is configured for pivotable attachment to a vehicle's frame adjacent to its proximal end. The distal end of the first elongated support member is attached to the first bracket. The second elongated support member has proximal and distal ends and is configured for pivotable attachment to a vehicle's frame adjacent to its proximal end. The distal end of the second elongated support member is attached to the first bracket. The first bracket comprises stamped sheet metal and defines a first opening configured for receiving a left wheel knuckle on a vehicle. The right suspension arm comprises a third elongated support member that is substantially identical to the first elongated support member, a fourth elongated support member that is substantially identical to the second elongated support member, and a second bracket that is substantially identical to the first bracket. The third elongated support member and the fourth elongated support member are both attached to the second bracket and are configured for pivotable attachment to a vehicle's frame. The second bracket defines a second opening configured for receiving a right wheel knuckle on a vehicle.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EMBODIMENTS

Figure 1:
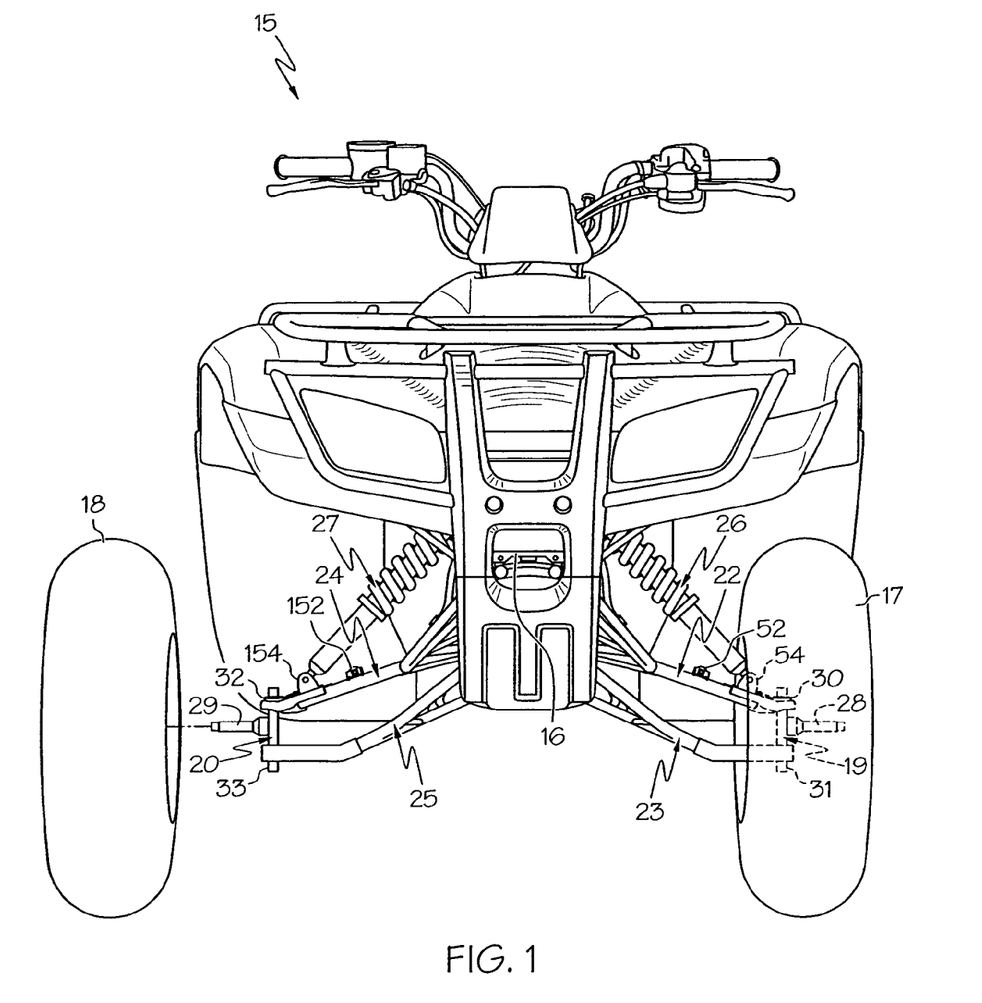
FIG. 1 is a front view depicting an all terrain vehicle ("ATV") in accordance with one embodiment of the present invention, wherein the right front wheel is removed for clarity of illustration.

The present invention and its operation are hereinafter described in detail in connection with the views and examples of FIGS. 1-9, wherein like numbers indicate the same or corresponding elements throughout the views. A suspension arm in accordance with the teachings of the present invention can be used in association with any of a variety of wheeled vehicles such as, for example, cars, trucks, vans, and recreational vehicles. For example, as depicted in FIG. 1, an ATV 15 includes a frame 16, a left wheel 17, and a right wheel 18. The left wheel 17 and the right wheel 18 are shown to be configured as front wheels for the ATV 16. The left wheel 17 is shown to be rotatably supported upon a first spindle 28 of a first wheel knuckle 19, and the right wheel 18 is shown for rotational support by a second spindle 29 of a second wheel knuckle 20.

The first wheel knuckle 19 is shown to be supported with respect to the frame 16 of the ATV 15 by suspension arms 22 and 23. Likewise, the second wheel knuckle 20 is shown to be supported with respect to the frame 16 of the ATV 15 by suspension arms 24 and 25. Ball joints can be employed to facilitate connections between the wheel knuckles and the suspension arms. In particular, the first wheel knuckle 19 can comprise first ball joints 30, 31, and the second wheel knuckle 20 can comprise second ball joints 32, 33. For example, as described in further detail below with reference to FIGS. 2 and 6, the first ball joint 30 can be received within an opening 45 in a bracket 40 of the suspension arm 22, and the second ball joint 32 can be received within an opening 145 in a bracket 140 of the suspension arm 24.

A cushion 26 is shown to attach to a utility tab 54 provided on the suspension arm 22. Likewise, a cushion 27 is shown to be attached to a utility tab 154 provided upon the suspension arm 24. The cushions 26 and 27 are also attached to the frame 16 of the ATV 15. The cushions 26 and 27 can comprise shocks, struts, springs, and/or other devices for use in resiliently supporting the suspension arms 22, 23 with respect to the frame 16 of the ATV 15.

Figure 2:
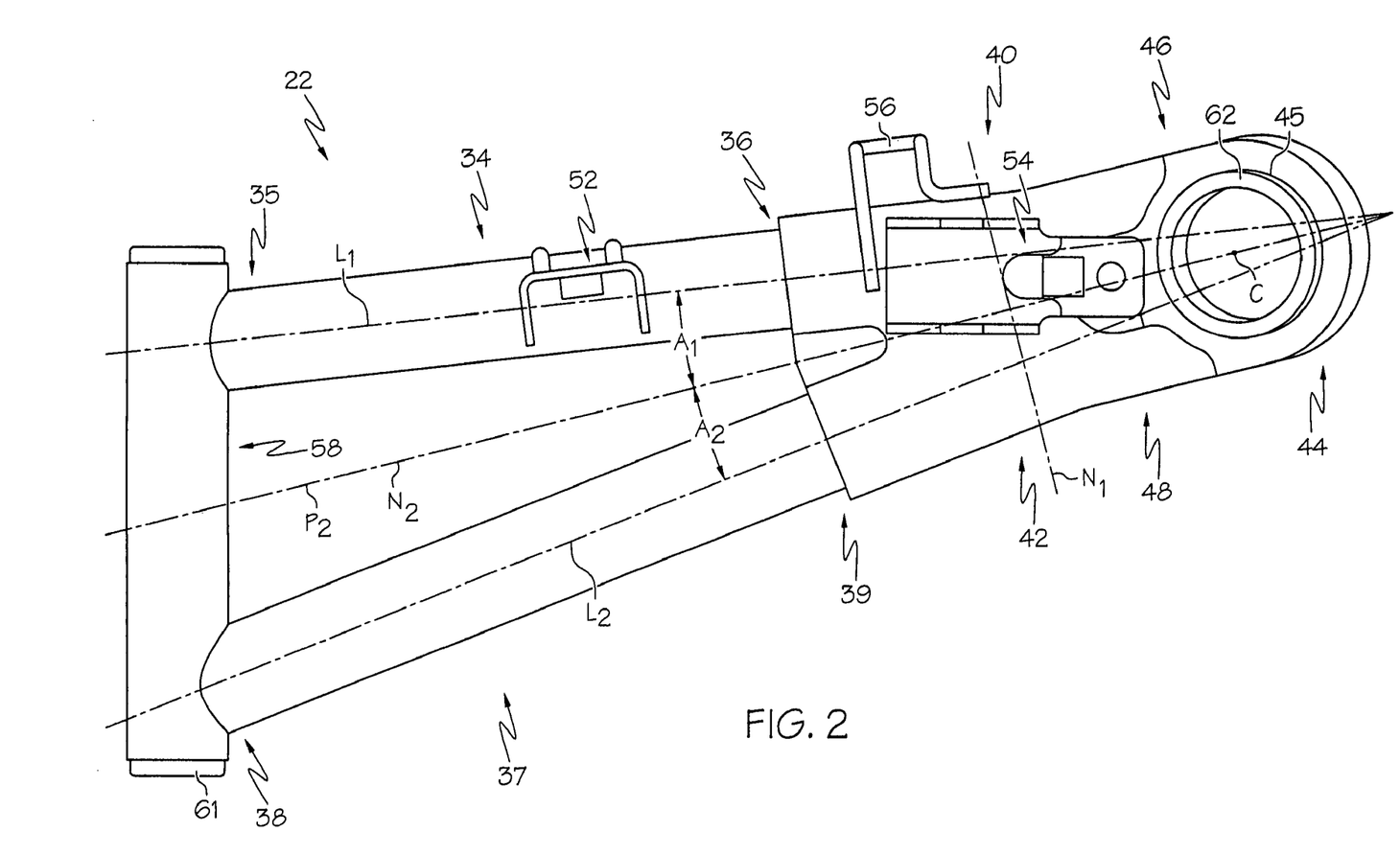
FIG. 2 is a top plan view depicting a suspension arm removed from the ATV of FIG. 1.

Turning now to FIG. 2, the suspension arm 22 is shown as being removed from the ATV 15 and to include a first elongated support member 34, a second elongated support member 37, a third elongated support member 58 and a bracket 40. The first elongated support member 34 extends along a longitudinal axis $L_1$ from a proximal end 35 to a distal end 36. Likewise, the second elongated support member 37 extends along a longitudinal axis $L_2$ from a proximal end 38 to a distal end 39. Each of the first elongated support member 34, the second elongated support member 37, and the third elongated support member 58 are shown to comprise substantially straight pipes.

The bracket 40 includes an attachment portion 42 and a kick portion 44 which are both formed substantially or entirely from stamped sheet metal. In one embodiment, as shown in FIGS. 2-5, the attachment portion 42 and the kick portion 44 can be integrally formed from the same piece of stamped sheet metal. In another embodiment, however, an attachment portion and a kick portion can be formed from respective pieces of sheet metal for subsequent assembly together. The kick portion 44 can be angled with respect to the attachment portion 42 (see FIG. 3) and can define an opening 45 configured for receiving a wheel knuckle (e.g., 19 in FIG. 1). In one particular embodiment, a ring 62 can be welded or otherwise provided within the opening 45 and can be configured to receive a ball joint (e.g., 30 in FIG. 1) associated with a wheel knuckle (e.g., 19 in FIG. 1). The ring 62 can be stamped or forged. The attachment portion 42 of the bracket 40 can have a bottom surface 50 to which the distal ends 36, 39 of the first and second elongated support members 34, 37 can be respectively attached (e.g., by welding). As shown more clearly in FIG. 3, the bracket 40 can include a support rib 64 welded or otherwise attached to the bottom surface 50 and extending from the bottom surface 50 and to which the first and second elongated support members 34, 37 can additionally be attached (e.g., by welding).

Figure 3:
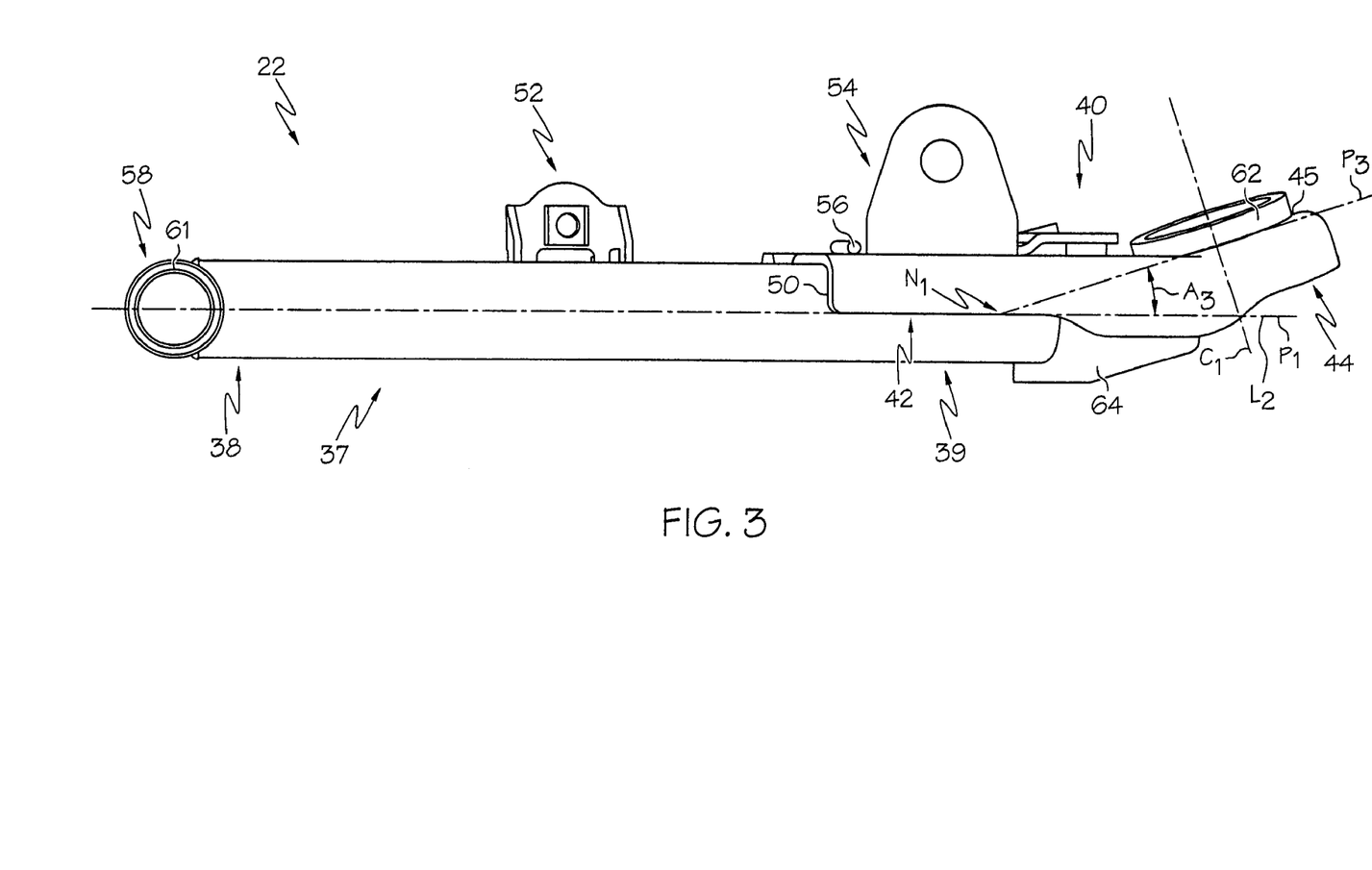
FIG. 3 is a side elevational view depicting the suspension arm of FIG. 2.
Figure 4:
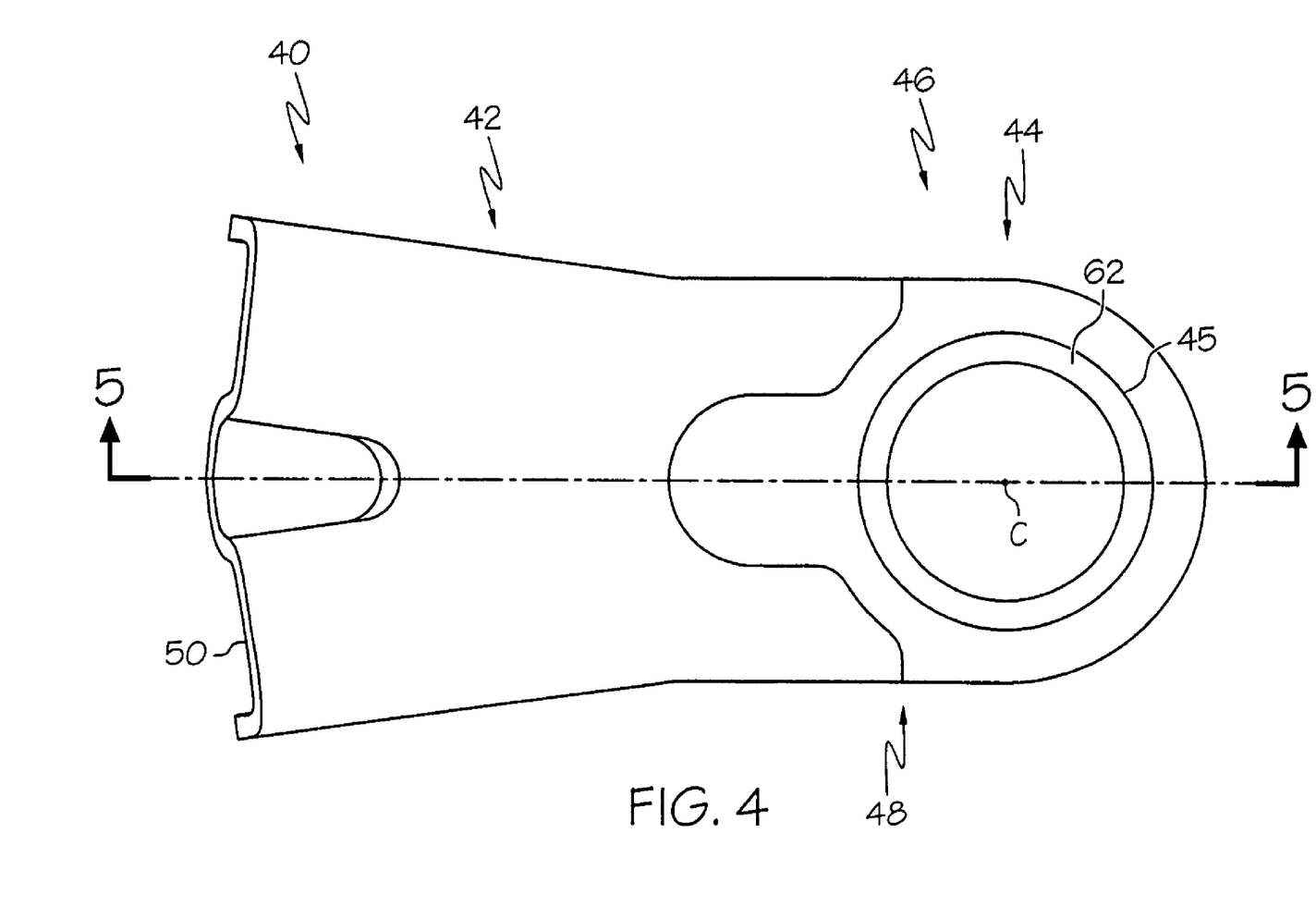
FIG. 4 is a top plan view depicting the bracket removed from the suspension arm of FIGS. 2-3.
Figure 5:
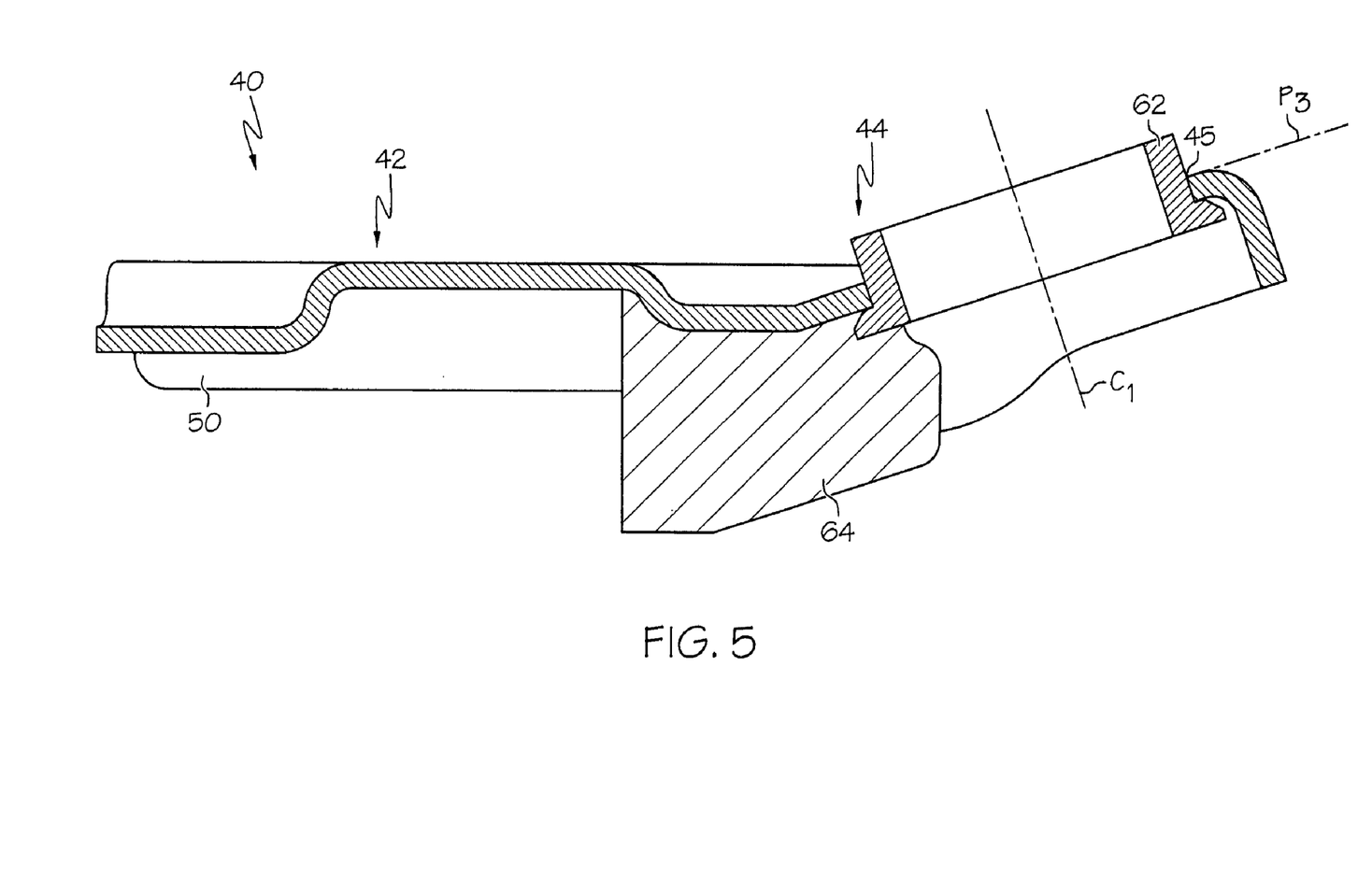
FIG. 5 is a sectional view depicting the bracket of FIG. 4 and taken along lines 5-5 in FIG. 4.

More particular reference will now be made to the suspension arm 22 with reference to FIGS. 2-5. It will be appreciated that the first longitudinal axis $L_1$ and the second longitudinal axis $L_2$ together define a first plane $P_1$, as shown in FIG. 3. At least a portion of the attachment portion 42 is shown to be parallel with the first plane $P_1$ so that the attachment portion 42 can effectively contact each of the first and second elongated support members 34, 37 for attachment thereto. The kick portion 44 can be angled with respect to the attachment portion 42 and can extend away from the attachment portion 42 at an angle $A_3$ to the first plane $P_1$.

A second plane $P_2$ (shown in FIG. 2) which is perpendicular to the first plane $P_1$ intersects the center of the opening 45 ("C" shown in FIGS. 2 and 4, and which lies on a central axis $C_1$ of the opening 45 shown in FIGS. 3 and 5) and divides the bracket 40 into a first side 46 and a second side 48 such that the bracket 40 is substantially symmetrical about the second plane $P_2$. The distal end 36 of the first elongated support member 34 can be welded to the bottom surface 50 of the attachment portion 42 substantially on the first side 46, and the distal end 39 of the second elongated support member 37 can be welded to the bottom surface 50 of the attachment portion 42 substantially on the second side 48. The angle of incidence $A_1$ located on the first plane $P_1$ between the first longitudinal axis $L_1$ and the second plane $P_2$ is shown to be substantially the same as the angle of incidence $A_2$ located on the first plane $P_1$ between the second longitudinal axis $L_2$ and the second plane $P_2$. The opening 45 in the kick portion 44 can have a circumference lying substantially on a third plane $P_3$, as shown in FIG. 3. Referring to FIGS. 2-3, the third plane $P_3$ can intersect the first plane $P_1$ along a line $N_1$ which is perpendicular to the line of intersection $N_2$ between the second plane $P_2$ and the first plane $P_1$. It will be appreciated that the same arrangement of planes, angles, and axes could be used to describe a suspension arm which may be used for the opposite side of the same vehicle (e.g., suspension arm 24 shown in FIG. 6).

A suspension arm can include one or more utility tabs provided in any of a variety of locations and configurations upon the suspension arm. Utility tabs can be forged, stamped, extruded, or manufactured through some other process, and can be used for securement of brake lines, electrical wires, cushions, or other items to a suspension arm. In accordance with one embodiment of the present invention, as shown in FIG. 2, the suspension arm 22 can include utility tabs 52, 54 and 56. The utility tab 54 can be configured, as described above, for attachment to a cushion (e.g. 26 in FIG. 1). The utility tabs 52 and 56 can be configured to support attachment of a brake line to the suspension arm 22. It will be appreciated that the utility tabs 52, 54 and 56 can be attached (e.g., by welding) to the first elongated support member 34 and/or the bracket 40, as the case may be, during or after assembly of the bracket 40 to the first and second elongated support members 34, 37.

The first and second elongated support members 34, 37 can be configured for pivotable attachment to the frame 16 of the ATV 15 adjacent to their proximal ends 35, 38. For example, as shown in FIG. 2, the proximal end 35 of the first elongated support member 34 is shown to be attached (e.g., by welding) to the third elongated support member 58, and the proximal end 38 of the second elongated support member 37 is shown to be attached (e.g., by welding) to the third elongated support member 58. The third elongated support member 58 can be then be rotatably attached to the frame 16 of the ATV 15, thereby resulting in a pivotable attachment of the first and second elongated support members 34, 37 to the frame 16 adjacent to the proximal ends 35, 38 of the first and second elongated support members 34, 37.

The third elongated support member 58 can include a support arrangement 61 to facilitate an effective pivotable connection between the suspension arm 22 and the frame of a vehicle (e.g., 16 in FIG. 1). It will be appreciated that a support arrangement (e.g., 61) can include any of a variety of bearings, bushings, collars, seals, and/or other components which can facilitate an effective pivotable connection between the third elongated support member 58 and a vehicle. In one particular embodiment, the support arrangement 60 can comprise two bushings which are disposed at opposite ends of the elongated support member 58 and which support an elongated collar which passes through substantially the entire length of the third elongated support member 58. In another embodiment, an axle, bolt or other component can be supported by a vehicle and can be inserted through the third elongated support member 58 and the support arrangement 61 in order to effectuate a pivotable connection between the suspension arm 22 and a vehicle's frame. It will be appreciated that alternative components and/or connections might be provided to facilitate an attachment between the third elongated support member 58 and a vehicle's frame. In fact, a suspension arm in accordance with the teachings of the present invention might be pivotally attached to a vehicle's frame without use of a third elongated support member (e.g. 58).

Figure 7:
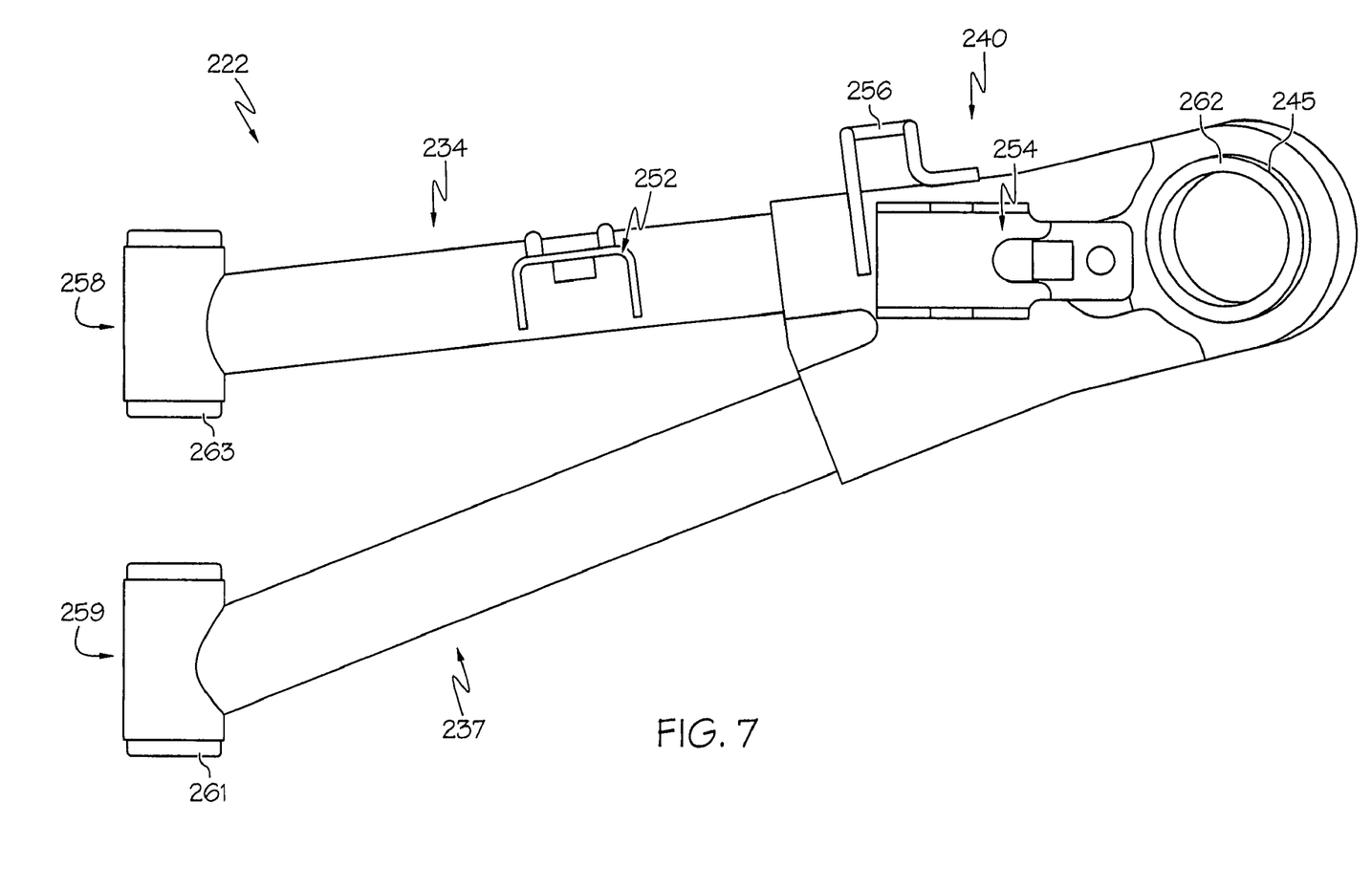
FIG. 7 is a top plan view depicting a suspension arm in accordance with another embodiment of the present invention.

For example, as shown in FIG. 7, a suspension arm 222 can be manufactured similarly to the suspension arm 22 of FIG. 2, except that the third elongated support member 58 of the suspension arm 22 is replaced with support members 258 and 259, as shown in FIG. 7. Each of the support members 258 and 259 can be provided with a support arrangement 263, 261, respectively. Together, the support members 258, 259 can facilitate an effective pivotal attachment of the suspension arm 222 to a vehicle's frame. While in one configuration a single bolt or axle might facilitate the connection of the support members 258, 259 to a vehicle's frame, separate bolts or axles might alternatively facilitate respective connections between each of the support members 258, 259 and a vehicle's frame. With exception of this difference, the remaining components of the suspension arm 222, such as the first elongated support member 234, the second elongated support member 237, the bracket 240, the utility tabs 252, 254, 256, and the ring 262 (including the opening 245) can be substantially as described above with respect to corresponding components of FIG. 2. It will of course be appreciated that support members of a suspension arm could be pivotably attached to a vehicle's frame in any of a variety of alternative embodiments in accordance with the teachings of the present invention.

Figure 6:
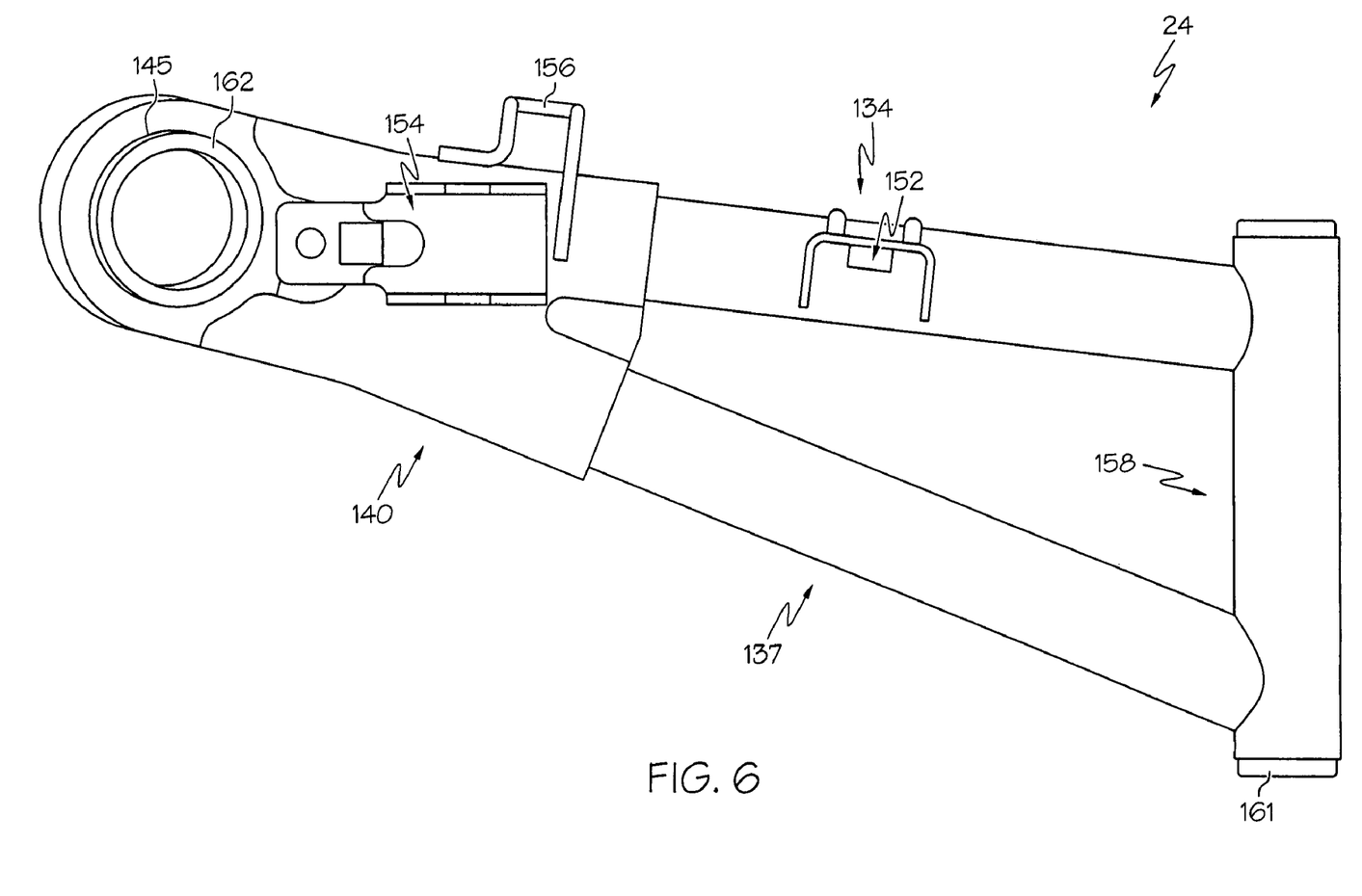
FIG. 6 is a top plan view depicting another suspension arm removed from the ATV of FIG. 1.

Referring to FIGS. 2 and 6, it can be seen that the suspension arm 24 for the right side of a vehicle (e.g., ATV 15 in FIG. 1) can be manufactured from the same elongated support members and bracket as are used to manufacture the suspension arm 22 for the left side of the same vehicle (e.g., ATV 15 in FIG. 1). In particular, the first elongated support member 134 of the suspension arm 24 can be substantially identical to the first elongated support member 34 of the suspension arm 22. Likewise, the second elongated support member 137 of the suspension arm 24 can be substantially identical to the second elongated support member 37 of the suspension arm 22. Also, the third elongated support member 158 (including its support arrangement 161) of the suspension arm 24 can be substantially identical to the third elongated support member 58 (including its support arrangement 61) of the suspension arm 22. Additionally, the bracket 140 of the suspension arm 24 can be substantially identical to the bracket 40 of the suspension arm 22, and the opening 145 in the bracket 140 and the ring 162 supported therein for receiving a wheel knuckle can be substantially identical to the opening 45 in the bracket 40 and the ring 62 supported therein. The first and second elongated support members 134, 137 are both shown as being attached to the bracket 140 and can be pivotably attached to the frame of a vehicle (e.g., 16 in FIG. 1).

In some circumstances, the same utility tabs might be usable to manufacture suspension arms for both the right and left sides of a vehicle. For example, referring again to FIGS. 2 and 6, it can be noted that utility tabs 52 and 152 are shown to be substantially the same and are thus usable when making a suspension arm for either the left or right side of a vehicle. Likewise, utility tabs 54 and 154 are shown to be substantially the same and thus usable when making a suspension arm for either the left or right side of a vehicle. However, as can be seen by comparing FIGS. 2 and 6, although the same utility tab 54, 154 can be used to manufacture either the right or left suspension arm for a vehicle, positioning of the utility tabs 54, 154 upon the brackets 40, 140 prior to welding may differ. Also, the utility tabs 56 and 156 are shown as being different. Accordingly, it will be appreciated that one or more components may differ between a pair of corresponding left and right suspension arms in accordance with the teachings of the present invention, although at least the brackets are substantially identical for both of the pair of suspension arms, and the first and second elongated support members may also be substantially identical for both of the pair of suspension arms. In an alternative embodiment of the present invention, all components of one of a pair of corresponding left and right suspension arms can be the same as those components used to manufacture the other of the pair of suspension arms.

Through use of a bracket in accordance with the teachings of the present invention, it will be appreciated that the same bracket can be used to manufacture a suspension arm for use on either a left side or a right side of a particular vehicle. It will furthermore be appreciated that because the bracket is formed from stamped sheet metal (e.g., with a wall thickness similar to that of the elongated support members), welding of the elongated support members to the bracket can be significantly simplified as compared to conventional suspension arm arrangements involving a forged bracket. Additionally, because a bracket in accordance with the teachings of the present invention can be effectively designed to accommodate attachment of elongated support members received at any of a variety of angles (due to the flexibility of stamping, and typically not achievable through forging), straight elongated support members can therefore be used instead of bent elongated support members. Hence, as a bracket in accordance with the teachings of the present invention can accommodate use of straight elongated supported members as opposed to bent or curved elongated support members, it will be appreciated that manufacturing time and costs involved in bending can be avoided.

Accordingly, a manufacturer of a pair of suspension arms in accordance with the teachings of the present invention can stock fewer components and need not implement pipe bending or other complex and expensive manufacturing processes. In particular, special stamping equipment is not required to produce differing brackets for each of the right and left sides of a vehicle, but rather the same stamping equipment can be used to manufacture brackets suitable for use on either side of the vehicle. Accordingly, a suspension arm in accordance with the teachings of the present invention effectively implements and captures all of the advantages of the stamped bracket design but without requiring use of bent pipes, and furthermore without requiring differing stamped brackets depending upon which side of the vehicle the stamped bracket is to be used.

It will be appreciated that suspension arms in accordance with one embodiment of the present invention may be angled relative to a vehicle's centerline differently than would certain conventional suspension arms (e.g., as depicted in FIGS. 8-9), and this may accordingly cause the associated wheel knuckles to be angled differently with respect to the suspension arms when the vehicle is idle. However, the ball joints interfacing the wheel knuckles and the suspension arms can have sufficient angle capability to accommodate this difference. Thus, through use of suspension arms in accordance with one embodiment of the present invention, the motion of the ball joints may no longer lie within the center of their available range when a vehicle is sitting idle. However, any offset from center of the ball joints can be sufficiently minimal such that performance of the vehicle is substantially unaffected, and such that any impact to the layout of a particular vehicle's overall suspension is nonexistent or minimal.

Although FIG. 1 depicts suspension arms (e.g., 22, 24) in accordance with one embodiment of the present invention being used as upper suspension arms to support front wheels of a vehicle, it will be appreciated that suspension arms in accordance with the present invention might alternatively be used to support rear wheels or other wheels of a vehicle. It will also be appreciated that suspension arms in accordance with the present invention could be used as upper suspension arms (e.g., 22, 24 in FIG. 1) and/or lower suspension arms (e.g., 23, 25 in FIG. 1) for supporting a wheel knuckle. Suspension arms in accordance with the present invention could also be used in any of a variety of alternate suspension arrangements including, for example, a McPherson strut type of suspension arrangement. It will therefore be appreciated that suspension arms in accordance with the teachings of the present invention can provide significant advantages, many of which are described above, when employed in any of a substantial variety of suspension arrangements.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A vehicle comprising:
a frame;
a left wheel;
a right wheel;
a first wheel knuckle supporting the left wheel;
a second wheel knuckle supporting the right wheel;
a first suspension arm comprising a first elongated support member, a second elongated support member, and a first bracket, the first elongated support member having a first longitudinal axis and proximal and distal ends and being pivotably attached to the frame adjacent to its proximal end, the distal end of the first elongated support member being attached to the first bracket, the second elongated support member having a second longitudinal axis and proximal and distal ends and being pivotably attached to the frame adjacent to its proximal end, the distal end of the second elongated support member being attached to the first bracket, the first bracket comprising a metal plate formed from stamped sheet metal, the metal plate being shaped to define a first attachment portion and a first kick portion, each of the first and second elongated members being attached to the first attachment portion, the first kick portion defining a first opening receiving either one of the first wheel knuckle and the second wheel knuckle, the first longitudinal axis and the second longitudinal axis together define a first plane, the first kick portion extends away from the first attachment portion at an angle to the first plane, a second plane which is perpendicular to the first plane intersects the center of the first opening and divides the first bracket into a first side and a second side such that the first bracket is substantially symmetrical about the second plane, thereby configuring the first bracket to be associated with either one of the left wheel and the right wheel, a first angle of incidence located on the first plane between the first longitudinal axis and the second plane is substantially the same as a second angle of incidence located on the first plane between the second longitudinal axis and the second plane, the first opening has a circumference lying substantially on a third plane, and the third plane intersects the first plane; and
a second suspension arm comprising a third elongated support member substantially identical to the first elongated support member, a fourth elongated support member substantially identical to the second elongated support member, and a second bracket substantially identical to the first bracket, the third elongated support member and the fourth elongated support member both being attached to the second bracket and being configured for pivotable attachment to the frame, and the second bracket defining a second opening receiving the other one of the first wheel knuckle and the second wheel knuckle.

2. The vehicle of claim 1 wherein the left wheel and the right wheel each comprise front wheels of the vehicle.

3. The vehicle of claim 1 comprising an all terrain vehicle.

4. The vehicle of claim 1 wherein the first wheel knuckle comprises a first ball joint received within the first opening in the first bracket, and the second wheel knuckle comprises a second ball joint received within the second opening in the second bracket.

5. The vehicle of claim 1 wherein each of the first elongated support member, the second elongated support member, the third elongated support member, and the fourth elongated support member comprise substantially straight pipes.

6. The vehicle of claim 1 wherein the first attachment portion comprises a first bottom surface, the distal end of the first elongated support member is attached to the first bottom surface substantially on the first side, the distal end of the second elongated support member is attached to the first bottom surface substantially on the second side, and the third plane intersects the first plane along a line which is perpendicular to the line of intersection between the second plane and the first plane.

7. The vehicle of claim 6 wherein the second bracket comprises a second attachment portion and a second kick portion which are both formed substantially from stamped sheet metal, the second attachment portion comprises a second bottom surface, the second kick portion defines the second opening, the third elongated support member has a third longitudinal axis, the fourth elongated support member has a fourth longitudinal axis, the third longitudinal axis and the fourth longitudinal axis together define a fourth plane, a fifth plane which is perpendicular to the fourth plane intersects the center of the second opening and divides the second bracket into a third side and a fourth side such that the second bracket is substantially symmetrical about the fifth plane, the third elongated support member is attached to the second bottom surface substantially on the third side, the fourth elongated support member is attached to the second bottom surface substantially on the fourth side, the second kick portion extends away from the second attachment portion at an angle to the fourth plane, a third angle of incidence located on the fourth plane between the third longitudinal axis and the fifth plane is substantially the same as a fourth angle of incidence located on the fourth plane between the fourth longitudinal axis and the fifth plane, the second opening has a circumference lying substantially on a sixth plane, and the sixth plane intersects the fourth plane along a line which is perpendicular to the line of intersection between the fifth plane and the fourth plane.

8. The vehicle of claim 7 wherein each of the first elongated support member, the second elongated support member, the third elongated support member, and the fourth elongated support member comprise substantially straight pipes.

9. A pair of suspension arms configured for pivotable attachment to a frame of a vehicle and for at least partially supporting left and right wheel knuckles on opposite sides of the vehicle, the pair of suspension arms comprising:
a left suspension arm comprising a first elongated support member, a second elongated support member, and a first bracket, the first elongated support member having a first longitudinal axis and proximal and distal ends and being configured for pivotable attachment to a vehicle's frame adjacent to its proximal end, the distal end of the first elongated support member being attached to the first bracket, the second elongated support member having a second longitudinal axis and proximal and distal ends and being configured for pivotable attachment to a vehicle's frame adjacent to its proximal end, the distal end of the second elongated support member being attached to the first bracket, the first bracket comprising a metal plate formed from stamped sheet metal, the metal plate being shared to define a first attachment portion and a first kick portion, each of the first and second elongated members being attached to the first attachment portion, the first kick portion defining a first opening configured for receiving one of a left wheel knuckle and a right wheel knuckle on a vehicle, the first longitudinal axis and the second longitudinal axis together define a first plane, the first kick portion extends away from the first attachment portion at an angle to the first plane, a second plane which is perpendicular to the first plane intersects the center of the first opening and divides the first bracket into a first side and a second side such that the first bracket is substantially symmetrical about the second plane, thereby configuring the first bracket to be associated with either one of a left wheel and a right wheel of a vehicle, a first angle of incidence located on the first plane between the first longitudinal axis and the second plane is substantially the same as a second angle of incidence located on the first plane between the second longitudinal axis and the second plane, the first opening has a circumference lying substantially on a third plane, and the third plane intersects the first plane; and a right suspension arm comprising a third elongated support member substantially identical to the first elongated support member, a fourth elongated support member substantially identical to the second elongated support member, and a second bracket substantially identical to the first bracket, the third elongated support member and the fourth elongated support member both being attached to the second bracket and configured for pivotable attachment to a vehicle's frame, and the second bracket defining a second opening configured for receiving the other one of the left wheel knuckle and the right wheel knuckle on a vehicle.

10. The pair of suspension arms of claim 9 wherein each of the first elongated support member, the second elongated support member, the third elongated support member, and the fourth elongated support member comprise substantially straight pipes.

11. The pair of suspension arms of claim 9 wherein the first attachment portion comprises a first bottom surface, the distal end of the first elongated support member is attached to the first bottom surface substantially on the first side, the distal end of the second elongated support member is attached to the first bottom surface substantially on the second side, and the third plane intersects the first plane along a line which is perpendicular to the line of intersection between the second plane and the first plane.

12. The pair of suspension arms of claim 11 wherein the second bracket comprises a second attachment portion and a second kick portion which are both formed substantially from stamped sheet metal, the second attachment portion comprises a second bottom surface, the second kick portion defines the second opening, the third elongated support member has a third longitudinal axis, the fourth elongated support member has a fourth longitudinal axis, the third longitudinal axis and the fourth longitudinal axis together define a fourth plane, a fifth plane which is perpendicular to the fourth plane intersects the center of the second opening and divides the second bracket into a third side and a fourth side such that the second bracket is substantially symmetrical about the fifth plane, the third elongated support member is attached to the second bottom surface substantially on the third side, the fourth elongated support member is attached to the second bottom surface substantially on the fourth side, the second kick portion extends away from the second attachment portion at an angle to the fourth plane, a third angle of incidence located on the fourth plane between the third longitudinal axis and the fifth plane is substantially the same as a fourth angle of incidence located on the fourth plane between the fourth longitudinal axis and the fifth plane, the second opening has a circumference lying substantially on a sixth plane, and the sixth plane intersects the fourth plane along a line which is perpendicular to the line of intersection between the fifth plane and the fourth plane.

13. The pair of suspension arms of claim 12 wherein each of the first elongated support member, the second elongated support member, the third elongated support member, and the fourth elongated support member comprise substantially straight pipes.

14. A pair of suspension arms configured for pivotable attachment to a frame of a vehicle and for at least partially supporting left and right wheel knuckles on opposite sides of the vehicle, the pair of suspension arms comprising:

a left suspension arm; and a right suspension arm;

wherein at least one of the left suspension arm and the right suspension arm comprises:

a first elongated support member having proximal and distal ends and being configured for pivotable attachment to a vehicle's frame adjacent to its proximal end, the first elongated support member having a first longitudinal axis;

a second elongated support member having proximal and distal ends and being configured for pivotable attachment to a vehicle's frame adjacent to its proximal end, each of the first and second elongated support members being substantially straight, the second elongated support member having a second longitudinal axis, wherein the first longitudinal axis and the second longitudinal axis together define a first plane; and a bracket comprising a metal plate formed from stamped sheet metal, the metal plate being shaped to define an attachment portion and a kick portion, wherein the kick portion extends away from the attachment portion at an angle to the first plane and defines an opening configured for receiving a wheel knuckle, the first elongated support member and the second elongated support member are attached to the attachment portion, a second plane which is perpendicular to the first plane intersects the center of the opening and divides the bracket into a first side and a second side such that the bracket is substantially symmetrical about the second plane, thereby configuring the bracket to be associated with either one of a left wheel and a right wheel of a vehicle, a first angle of incidence located on the first plane between the first longitudinal axis and the second plane is substantially the same as a second angle of incidence located on the first plane between the second longitudinal axis and the second plane, the opening in the kick portion has a circumference lying substantially on a third plane, and the third plane intersects the first plane.

15. The pair of suspension arms of claim 14 wherein the attachment portion comprises a bottom surface, the distal end of the first elongated support member is welded to the bottom surface of the attachment portion substantially on the first side of the bracket, and the distal end of the second elongated support member is welded to the bottom surface of the attachment portion substantially on the second side of the bracket.

16. The pair of suspension arms of claim 15 wherein at least a portion of the attachment portion extends parallel with the first plane.

17. The pair of suspension arms of claim 15 wherein the third plane intersects the first plane along a line which is perpendicular to the line of intersection between the second plane and the first plane.

18. The pair of suspension arms of claim 17 wherein a first angle of incidence located on the first plane between the first longitudinal axis and the second plane is substantially the same as a second angle of incidence located on the first plane between the second longitudinal axis and the second plane.

19. The pair of suspension arms of claim 14 further comprising at least one utility tab attached to at least one of the bracket and the first elongated support member.

20. The pair of suspension arms of claim 14 further comprising a third elongated support member attached to the proximal ends of the first and second elongated support members, the third elongated support member being configured for attachment to a vehicle's frame.

* * * * *

UNITED STATES PATENT AND TRADEMARK OFFICE
CERTIFICATE OF CORRECTION

PATENT NO.        : 7,571,918 B2
APPLICATION NO.   : 11/395859
DATED             : August 11, 2009
INVENTOR(S)       : Lee N. Bowers It is certified that error appears in the above-identified patent and that said Letters Patent is hereby corrected as shown below:

Claim 9, Column 11, line 1, change "shared" to --shaped--.

Signed and Sealed this

Thirteenth Day of October, 2009

David J. Kappos
*Director of the United States Patent and Trademark Office*